United States Patent
Bankier et al.

(10) Patent No.: US 6,567,814 B1
(45) Date of Patent: May 20, 2003

(54) METHOD AND APPARATUS FOR KNOWLEDGE DISCOVERY IN DATABASES

(75) Inventors: John Duncan Bankier, Glasgow (GB); Charles Allan Beck, Glasgow (GB); Andrew Craig Brind, Glagow (GB); David John Brown, Glasgow (GB); Kristy Irene Brown, Glasgow (GB); John Dominic Burns, Glasgow (GB); Peter James Docherty, Glasgow (GB); John Michael Gilchrist, Glasgow (GB); Timothy Simon Jones, Boston, MA (US); Gordon McIntyre, East Kilbride (GB); Alan John Ryman, Glasgow (GB); William Wallace, Glasgow (GB)

(73) Assignee: thinkAnalytics Ltd, Glasgow (GB)

( * ) Notice: Subject to any disclaimer, the term of this patent is extended or adjusted under 35 U.S.C. 154(b) by 0 days.

(21) Appl. No.: 09/383,354

(22) Filed: Aug. 26, 1999

Related U.S. Application Data

(60) Provisional application No. 60/098,013, filed on Aug. 26, 1998.

(51) Int. Cl.[7] .............................................. G06F 17/30
(52) U.S. Cl. ...................................... 707/101; 707/100
(58) Field of Search ............................... 707/101, 100, 707/104.1

(56) References Cited

U.S. PATENT DOCUMENTS

| | | | | |
|---|---|---|---|---|
| 5,471,611 A | | 11/1995 | McGregor | 707/4 |
| 5,649,181 A | | 7/1997 | French et al. | 707/3 |
| 5,706,495 A | | 1/1998 | Chadha et al. | 707/2 |
| 5,787,425 A | * | 7/1998 | Bigus | 707/6 |
| 5,794,228 A | | 8/1998 | French et al. | 707/2 |
| 5,794,229 A | | 8/1998 | French et al. | 707/2 |
| 5,813,011 A | * | 9/1998 | Yoshida et al. | 707/101 |
| 6,014,671 A | * | 6/2000 | Castelli et al. | 707/101 |
| 6,092,071 A | * | 7/2000 | Bolan et al. | 707/101 |
| 6,128,608 A | * | 10/2000 | Barnhill | 706/16 |
| 6,216,213 B1 | * | 4/2001 | Breternitz, Jr. et al. | 711/170 |
| 6,266,668 B1 | * | 7/2001 | Vanderveldt et al. | 707/10 |
| 6,311,181 B1 | * | 10/2001 | Lee et al. | 707/5 |

FOREIGN PATENT DOCUMENTS

| | | | |
|---|---|---|---|
| WO | WO97/32263 | 9/1997 | G06F/17/30 |
| WO | WO97/35256 | 9/1997 | G06F/12/02 |

OTHER PUBLICATIONS

Rubin, Fuzzy Mining of Meterological Data, Fuzzy Information Proc. Societ–NAFIPS, Aug. 1998 Conf. of the North American IEEE, p. 44–49.*

Computer Science, University of Strathclyde, W.P. Cockshott, J. Gilchrist, D.R. McGregor, P. Murray and J.N. Wilson, Mar. 11, 1996.

\* cited by examiner

*Primary Examiner*—Greta Robinson
(74) *Attorney, Agent, or Firm*—Howrey Simon Arnold & White, LLP

(57) ABSTRACT

A computer-based method and apparatus for knowledge discovery from databases. The disclosed method involves the user creation of a project plan comprising a plurality of operational components adapted to cooperatively extract desired information from a database. In one embodiment, the project plan is created within a graphical user interface and consists of objects representing the various functional components of the overall plan interconnected by links representing the flow of data from the data source to a data sink. Data visualization components may be inserted essentially anywhere in the project plan. One or more data links in the project plan may be designated as caching links which maintain copies of the data flowing across them, such that the cached data is available to other components in the project plan. In one embodiment, compression technology is applied to reduce the overall size of the database.

17 Claims, 8 Drawing Sheets

METHOD AND APPARATUS FOR KNOWLEDGE DISCOVERY IN DATABASES

PRIOR APPLICATION

This application claims the priority of prior provisional U.S. patent application Ser. No. 60/098,013 filed on Aug. 26, 1998, the content of which being hereby incorporated by reference herein in its entirety.

FIELD OF THE INVENTION

This invention relates generally to the field of computer databases, and more particularly relates to a method and apparatus for knowledge discovery from databases.

BACKGROUND OF THE INVENTION

Throughout the 1980's and early 1990's, many major corporations adopted so-called "business intelligence" tools such as spreadsheets, report writers, and on-line analytical processing ("OLAP") servers to gain a competitive advantage through better business decision-making. However, the exponential increase in information resulting from the electronic capture of data and its storage in vast data warehouses has dramatically reduced the perceived benefits of such tools. Such tools are valuable for monitoring and planning, but are unable to cope with the large volumes of data or the sophisticated analysis that is required for strategic decision-making if organizations are to achieve or maintain a competitive status.

For many types of businesses, strategic value may be derived from understanding customer behavior and being able to model customers' responses to evaluate alternative actions. The knowledge required to anticipate behavior cannot be discovered by computer users running a large number of traditional queries against data warehouses. Moreover, answering complex questions through traditional database queries is impractical, since users may not have sufficient time to complete such analyses.

"Knowledge discovery from databases" (referred to herein as "KDD") is perceived by some to be a powerful method of enabling an organization to better understand the dynamics at work in a particular context, for example, in the context of a consumer market for a particular product or service, by automatically searching through large amounts of data, searching for otherwise hidden patterns and relationships of events, and presenting these to the user in a readily understandable format. (An early instance of the use of the term "knowledge discovery" may be found in "Advances in Knowledge Discovery & Data Mining," Fayyad et al, eds., MIT Press, 1996. KDD systems may be fully automated, freeing up skilled human resources and finding answers to important questions that users might otherwise not known to ask.

Because KDD involves searching for hidden information that is commercially valuable, it is often confused with "data mining." However, data mining is only one aspect of the KDD process. A KDD process may be broken into several phases, and may be cyclical and iterative, with the results of one phase driving requirements for further phases. Each stage is essential to ensure that knowledge is successfully extracted from data. The identified knowledge can be used to achieve a wide range of objectives, such as making predictions about new data, identifying and explaining hidden patterns and trends in existing data, and summarizing the contents of large databases to facilitate understanding.

A simple example application of Knowledge Discovery is to predict whether a loan application should or should not be granted to a particular applicant. Such a decision can be based on the history of previous applicants who subsequently did, or did not, repay the loan extended to them. Use would be made of data from these previous loans to determine any statistically significant characteristics of applicants who did or did not eventually repay the loan. An algorithm may be trained to assess these features in future applicants and give an indication of how likely the applicant was to repay the loan.

An initial phase of a KDD process focuses on understanding the objectives of the process from a particular perspective. This objective may be converted into a KDD problem definition so that a preliminary KDD plan can be designed to achieve the objectives.

Starting with an initial plan, the user of a KDD system must identify what data is required, where it may be found, what format it is in, and what external sources of missing data are available. This stage of a KDD process provides the first insights into the data and must identify and find solutions for any data quality issues that may exist.

In a data preparation phase, data is "cleaned" and transformed to ready it for a data modeling phase. In a data modeling phase, various known techniques may be applied. Some techniques require certain forms of data, so that a reiteration of the data preparation phase may be required. This is the process often referred to as data mining.

After the modeling phase has been completed, the results must be reviewed to confirm that the model used solves the original problem. If not, it must be determined what has been missed. At the end of this evaluation phase, a decision should be reached as to how to use the results to accomplish the identified objectives. To this end, the new knowledge gained must be deployed, i.e., organized and presented in such a way that it may be used effectively.

KDD and data warehousing are complementary concepts addressing a demand for better use of information. An existing data warehouse may provide a rich source of data for KDD, but may still need to be augmented by data sourced from operational systems and external sources.

The need for data warehousing was driven by the requirement in many organizations to better understand the data already existing in different processing systems, and to enable organizations to make better use of such existing data. The need to integrate the data held in different processing systems makes it desirable to centralize data. Data warehouse volumes for many commercial organizations now commonly exceed 100 gigabytes of information, and the number of systems over one terabyte (1,000 gigabytes) is growing rapidly. OLAP systems commonly handle ten to twenty gigabytes of information, with some handling up to 100 gigabytes.

As the volume of available data increases, the number of possible permutations of data relationships grows exponentially. The volume can become too great for users to explore and analyze, increasing the risk that important patterns and relationships may be overlooked. This is the reason that data mining techniques are being increasingly adopted for KDD.

The following table contrasts the sorts of questions that a data warehouse or OLAP tool can answer against those that KDD systems are well-suited to solve:

TABLE 1

| TYPICAL OLAP QUESTIONS | TYPICAL KDD QUESTIONS |
| --- | --- |
| Which customers spent the most last year? | Which customers should be targeted with a future promotion? |
| How many customers closed their accounts in the previous six months as compared to the same period last year? | Which customers are most likely to switch their accounts to a competitor in the next six months? |
| Which stores failed to meet target goals last month? | What is the optimum size and location of a new store? |
| What were the top selling five products by revenue? | Which additional products are most likely to be sold with a purchase from the delicatessen counter? |
| How much did the bank lose on failed loans in the last year? | Which customers are most likely to default on a loan? |

As the examples in Table 1 illustrate, OLAP and KDD techniques may be advantageously applied in a variety of commercial contexts, including retail organizations, banks, and many others, including marketing, insurance, sales, personnel, medical, fraud detection, customer care.

KDD is perceived by many as the next step in the natural evolution of the reporting and OLAP systems deployed over the last ten or more years. KDD tools and techniques can analyze the same operational data or data warehouse data that populates and OLAP system, although KDD processes may require data preparation specific to the form of algorithm to be applied. Such data preparation may be needed on both operational and data warehouse sources.

On very large data warehouse, KDD techniques may be employed to select the information required for further OLAP analysis, as it may not be feasible to load all of the original data into an OLAP system, or event to know which information would be appropriate to achieve given objectives.

There are a number of perceived deficiencies or limitations on current OLAP, data mining, and KDD products, including: limited scalability (i.e., inability to operate on data stores over a certain limit); unfeasible computer processing requirements; the need for expensive data hygiene; the need for user expertise in the operation of certain systems; and minimal integration with existing data warehouse architectures.

SUMMARY OF THE INVENTION

In view of the perceived limitations or deficiencies in existing OLAP, data mining, and KDD products, the present invention relates to an improved method and apparatus for efficient extraction of meaningful knowledge from potentially very large databases.

In accordance with one aspect of the invention, a knowledge discovery ("KD") process is defined in terms of a process plan created by a user seeking to extract knowledge from a database. The process plan comprises a plurality of separate components, with each component representing a stage in the overall KD process. Components in a process plan are connected by data links, such that the output of one component may be applied to the input of another.

The modularization of the overall process plan and the breaking down of the plan into constituent components facilitates the creation of the process plan using a conventional graphical user interface. Further, the modularization of the process plan enables a KD process to be executed on a distributed platform possibly comprising multiple computers interconnected, for example, by a computer network. Such distribution enables systems in accordance with the present invention to take advantage full of available processing resources. Still further, the modularization of the process plan enhances the versatility of the system, since individual components for performing different data transformation and manipulation functions can be introduced into the process plan as "plug-ins."

In accordance with another aspect of the invention, a database from which knowledge is to be extracted is first subjected to a data compression process which substantially and advantageously reduces the overall size of the database to be processed. In accordance with another aspect of the invention, the compression process preferably is of a type in which full decompression of the data is not necessary in order for individual components in the process plan to perform their designated functions.

In accordance with another aspect of the invention, data caches associated with designated links connecting components of the process plan may be provided. Such data caches enhance the overall efficiency of the system, since their availability can reduce the need to restart a process plan from the beginning in the event it is necessary or desirable to repeat or reiterate execution of one or more of the components comprising the process plan.

In accordance with still another aspect of the invention, a data compression process is also employed in the creation and maintenance of data caches associated with links in the process plan. This advantageously reduces the size of the caches, thereby increasing the feasibility of maintaining such caches at multiple points within the overall process plan. Overall speed and efficiency of the KD process is enhanced as additional caches are available, particularly with highly iterative and repetitive process plans.

BRIEF DESCRIPTION OF THE DRAWINGS

The foregoing and other features and aspects of the subject invention will be best understood with reference to a detailed description of a specific embodiment of the invention, which follows, when read in conjunction with the accompanying drawings, in which:

FIG. 7a shows a data source component, FIG. 7b shows a data sink component, FIGS. 7c and 7d show permissible interconnections between components, and FIGS. 7e through 7h shown impermissible interconnections between components;

FIG. 10b is an enlarged representation of a portion of the graphical user interface from FIG. 10a.

DETAILED DESCRIPTION OF A SPECIFIC EMBODIMENT OF THE INVENTION

Figure 1:
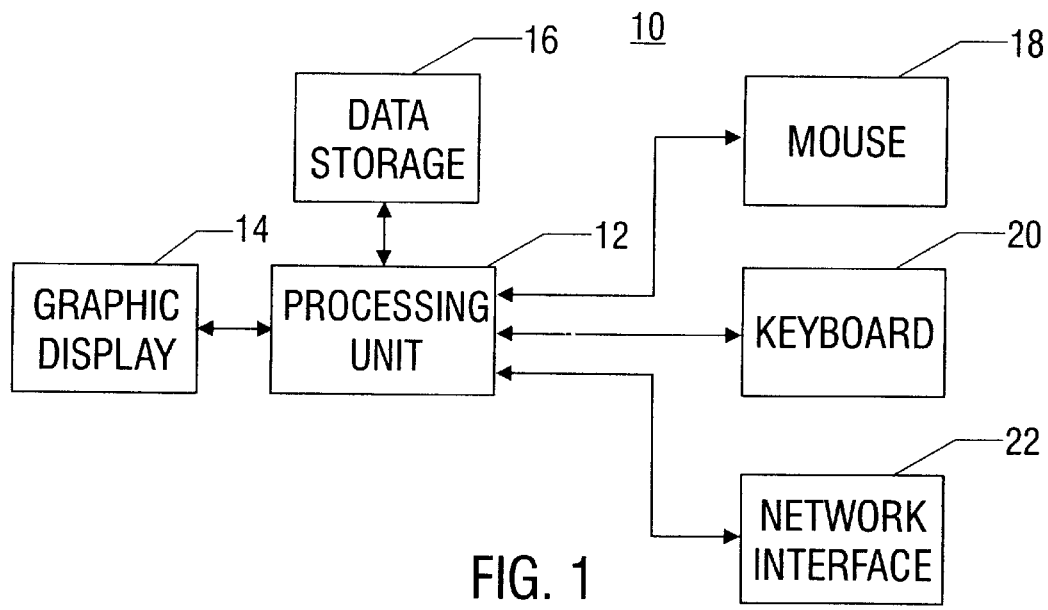
FIG. 1 is a simplified block diagram depicting a computer system with which the invention may be practiced.

In the disclosure that follows, in the interest of clarity, not all features of actual implementations are described. It will of course be appreciated that in the development of any such actual implementation, as in any such project, numerous engineering and programming decisions must be made to achieve the developers' specific goals and subgoals (e.g., compliance with system- and business-related constraints), which will vary from one implementation to another. Moreover, attention will necessarily be paid to proper engineering and programming practices for the environment in question. It will be appreciated that such a development effort might be complex and time-consuming, but would nevertheless be a routine undertaking for those of ordinary skill in the relevant fields.

Glossary

The following is a (non-exhaustive) glossary of terms and abbreviations used in the present disclosure.
Abbreviations
API Application Programmer Interface
BDD Business Data Dictionary
CORBA Common Object Request Broker Architecture
CSV Comma Separated Value
JNI Java™ Native Interface
JVM Java™ Virtual Machine
KD Knowledge Discovery
KDC KD Component
ORB Object Request Broker
RQS Requirements Specification
SQL Standard Query Language (or Structured Query Language)
SMP Single Multi-Processor
Terms and Definitions
Active Plan A Process Plan that has been loaded into a Framework by a user.
BDD Domain A representation of the type of data held by a field within the schema of a given BDD Source
BDD Schema A description of the organization of the data within a particular BDD Source
BDD Source A source of data to be accessed by a KD Component.
Business Data Dictionary A mechanism to support the incorporation of additional information about the data being accessed by a Framework
Cache A mechanism to support the storage of data to be transmitted between KD Components, giving random access to that data and allowing the data to be re-used between several executions of the same Active Plan.
Component Registry The store of available KD Components for use in Process Plans.
Data Link A link from an output on a KD Component to an input of another KD Component
Distribution Network The network of network hosts available to be utilized in executing a Process Plan.
Framework A set of related operations that can be configured to solve a set of problems in a particular domain.
Initialization Link A link from KD Storage to an item of configuration information for a KD Component.
KD Component A processing component of a Process Plan used to perform a given task within the plan.
KD Storage The data storage mechanism provided by Framework 62 to support the data storage requirements of KD Components and Process Plans.
Link See Data Link, Initialization Link or Result Link.
Plan Registry The store of available Process Plans.
Process Plan A combination of KD Components linked together to undertake a given Knowledge Discovery task.
Result Link A link from an item of configuration information for a KD Component to KD Storage.
Table A collection of Tuples used to provide random access to large numbers of Tuples.
Tuple A collection of raw data types (or combinations of types into data structures) that are transported between KD Components.

Referring to FIG. 1, there is shown a system 10 in accordance with one embodiment of the invention and with which the present invention may be advantageously practiced. As shown in FIG. 1, system 10 is based upon a more or less conventional processing unit 12. In the presently disclosed embodiment, processing unit 12 may be a general-purpose computer such as an Ultra™ 60 workstation commercially available from Sun Microsystems, Palo Alto, Calif. It is believed that other general purpose computers may be equally suitable for the purposes of practising the present invention, including, without limitation, workstations available from Silicon Graphics, Inc., Mountain View, Calif., or commonly available computers of the "personal computer" class, often based on an Intel Corp. Pentium™ microprocessor running at clock speeds of 300 MHz or so. Associated with processing unit 12 is a data storage device 16, which may take the form of an internal or external hard disk drive, writeable compact disk, high-density removable disk drive or the like having sufficient storage capacity to store a database of the potentially large size contemplated by the present invention. Also associated with processing unit 12 is a graphic display 14, which in the presently disclosed embodiment is a conventional cathode ray tube (CRT) capable of displaying graphic images.

Further associated with processing unit 12 are one or more user interface devices; two user interface devices designated with reference numerals 18 and 20 are depicted in FIG. 1. In the presently disclosed embodiment, user interface device 20 comprises, by way of example, a conventional alphanumeric keyboard, and user interface device 18 is a mouse or equivalent cursor control device for facilitating user control of a cursor or pointer displayed on display 14. Such user interface devices are common and well-known.

Finally, system 10 may further include a network interface 22 for enabling the system to communicate with other computers, for example by means of a local area network (LAN), wide area network (WAN), or the like. Such interconnectivity enables the present invention to be practiced on a distributed platform, as will be hereinafter described in further detail.

Knowledge Discovery from Databases

Knowledge discovery from databases ("KDD") is a process of extracting useful information from data. As noted above, KDD is to be distinguished from "data mining," which those of ordinary skill in the art will understand to refer to the application of specific algorithms and techniques for finding patterns in data. Although data mining may be considered one step in a broader KDD process, other stages are important for ensuring that knowledge is successfully extracted from the data. It should be possible to use the identified knowledge to, for example, make predictions about new data, explain patterns/trends in existing data, or summarize the contents of large databases to facilitate decision-making.

The KD Process

The requirements for a knowledge discovery ("KD") system can be derived from a study of how data analysts currently go about the KD process. Typically, the data analyst will be given a problem specification and one or more data sources. From the supplied data, the analyst will use appropriate analysis techniques in order to answer the problem. The results will then be presented in an appropriate format, for example as a report or as an application.

Figure 2:
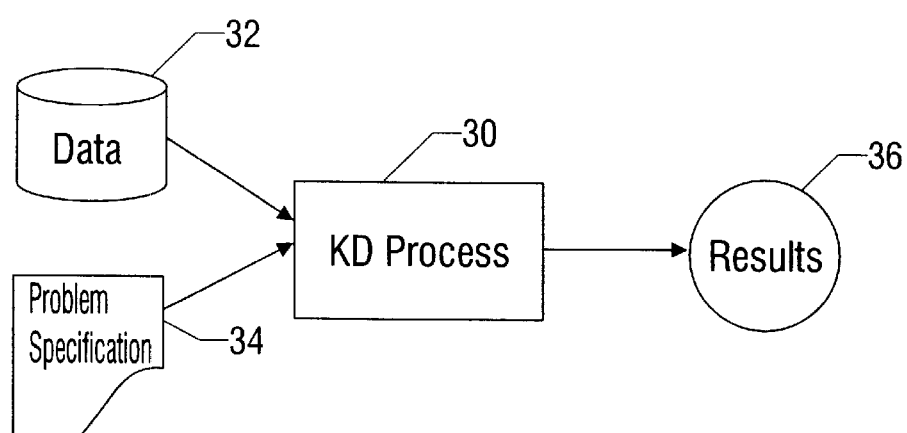
FIG. 2 is a block diagram showing inputs to and output from a knowledge discovery process in accordance with one embodiment of the invention.

In FIG. 2, there is shown a block diagram illustrating the inputs to, and outputs from, a KD process 30 in accordance with one embodiment of the invention. As those of ordinary skill in the art will appreciate, KD process 30 is embodied by computer processing system 10 executing suitable software for causing the computer and its associated peripheral devices to perform the computational and operational functions described herein. As shown in FIG. 2, KD process 30 receives as input, data from a data source (i.e., database) 32. Such data may be stored in data storage device 16 associated with system 10, or may be stored at some external location accessible remotely, such as via a network connection, the Internet, or the like.

As further shown in FIG. 2, KD process 30 must also be provided with a problem specification, as represented by block 34. An example problem specification from the retail world might be: "What are the factors leading to a successful sales promotion?" The analyst might be given data from previous sales promotions to answer this problem. The result from such an analysis, represented by block 36 in FIG. 2, may be, for example, in the form of a report to the store manager.

KD Steps

Figure 3:
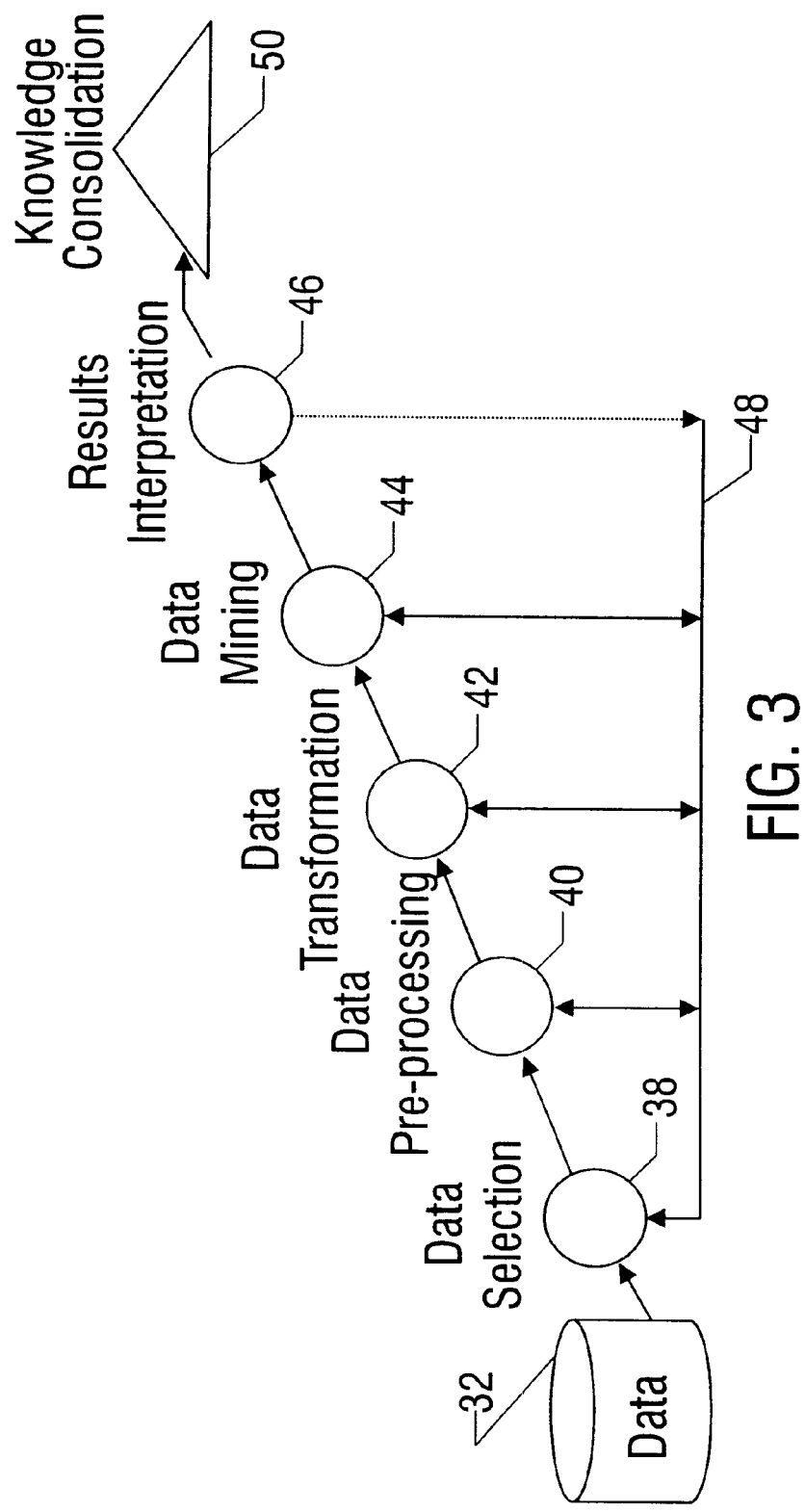
FIG. 3 is a block diagram showing the various phases of the knowledge discovery process from FIG. 2.

The general steps within KD process 30 are illustrated in the block diagram of FIG. 3. In particular, KD process 30 involves:

Problem Definition (reference numeral 34 in FIG. 2)

Data Evaluation/Selection (reference numeral 38 in FIG. 3)

Data Cleansing/Pre-Processing (reference numeral 40)

Data Transformation (reference numeral 42)

Choose Data Analysis Task

Choose Data Mining Algorithm(s)

Data Mining (reference numeral 44)

Results Interpretation (reference numeral 46)

Knowledge Consolidation (reference numeral 50)

In reality, the process is far more complex than this. Stages may involve much trial and error, for example different data mining algorithms may be tried and compared against each other; the data might be transformed in different ways, and so on. Notably, those of ordinary skill in the art will appreciate that the process could involve iterations through these basic stages with potential backtracking from any stage to any previous stage. In addition, stages could be repeated, for example the output from a data-mining algorithm may feed into the input of another. The iterative and repetitive nature of the overall process is represented in FIG. 3 by the network 48 of interconnections between the various stages. As will hereinafter be described in further detail, one aspect of the present invention involves providing intermediate caches of processed data in order to enhance the efficiency of KD process 30 despite the possibility for such backtracking and/or iteration.

Problem Analysis/Definition

As represented by block 34 in FIG. 2, the first requirement of the KD process 30 is specification of the problem to be solved. The analyst will be given a problem specification, normally in the form of a goal to be achieved. The main task here is to understand the overall goal required. The analyst may consider a number of questions at this stage: How the results should be presented? For example, is the deliverable a report or is it an application? What domain knowledge might be relevant to aid KD process 30. How and where is the data stored? How can the data be retrieved and will this retrieval cause any operation problems? The analyst may then use the findings to formulate a KD plan.

Data Evaluation/Selection

In data selection block 38, the analyst assesses the supplied data to determine if it is sufficient to answer the supplied problem. The data will be evaluated in a number of ways:

Content: Are the required fields contained within the data?

Quality: How "clean" is the data?

In order to understand the content of the database, the analyst may use known visualization tools to aid this stage. Once the data has been evaluated, the next aim of this step (block 38) is to create a target data set that will be used in the remainder of the KD process. This will normally involve querying the database, for example using SQL, in order to retrieve a relevant subset of the database.

Data Cleansing/Pre-processing

The data cleansing/pre-processing stage, represented by block 40 in FIG. 3, mainly involves cleansing of the data. For example, noise might be removed or missing data might be repaired. Visualization tools and statistical techniques may also be employed at this stage.

As it is the nature of most data mining techniques that they are more likely to deliver results when there are fewer variables under consideration, the aim of data pre-processing block 40 is also to further reduce the candidate data set in terms of the number of records, and in terms of the number of fields within a record. As will be familiar to those of ordinary skill in the art, record filtering can involve sampling (e.g. selecting 10% of the records) or filtering according to some criteria (e.g. select all records where sex is male), can be used to reduce the number of records under consideration. Fields filtering, i.e., the removal of fields can be used to reduce the number of fields within each record.

Data Transformation

Another task, represented by block 42 in FIG. 3, involves preparing the data for use with a particular algorithm; for example, a neural network algorithm might require all fields to be scaled between 0 and 1.

Analysis Task Selection

The analyst must match a particular data mining analysis task to the problem that is being addressed and the data available. The analyst will assess the characteristics of the different analysis types that fit the problem and the data. Those of ordinary skill in the art will be familiar with are a number of types of analysis tasks:

Association:

An association is a relationship between a number of facts. For example, if product A is purchased 95% of the time that product B is also purchased, there is an association between products A and B. Associations between data can be discovered using rule induction techniques.

Clustering:

Clustering involves the discovery of a group of entities that have similar characteristics, based on a set of parameters. For example, this could be a group of individuals who share the same characteristics such as income, location, products purchased, and so on. Clusters in data can be discovered using techniques such as neural networks, k-nearest neighbor and graphical visualization tools.

Classification:

Classification is the allocation of a given entity to a group, based on a number of parameters relating to the entity. For example, given the parameters of salary and debt, a loan applicant could be classified to be either a good or a bad loan risk. Known classification techniques include neural networks (back propagation) and decision trees or rule induction.

Sequential Patterns:

Discovering sequential patterns involves the prediction of an event, based on a set of circumstances. For example, if car driver age is less than 30 and male then likelihood of accident within 1 year is 35%. Sequential patterns can be discovered using neural networks.

Algorithm Selection

The analyst must also match one or more particular data mining algorithms to the analysis task chosen in the previous stage. The analyst will assess the characteristics of the different algorithms that fit the task, for example demand on resources, suitability of results, etc. to select an appropriate algorithm. Many different data mining algorithms are known and embodied in commercially-available software.

Data Mining

This stage, represented by block 44 in FIG. 3, involves setting up the selected data mining algorithm, i.e. supplying algorithm-specific parameters, and then running the algorithm. A variety of different algorithms are known to those of ordinary skill in the art. Such algorithms may be characterized by the representations resulting from their application. The underlying representation of the induced knowledge is important as it constrains what knowledge can be effectively represented by the system. There are several popular representations:

One data representation is the tuple, which is a common way to present data to a data mining system. A tuple is simply a fixed sized collection of individual data items of set types. All of the data in a tuple should be closely related in that they refer to one individual instance of some item, e.g., the tuple for a credit card transaction would contain the amount, an item description, etc. . . .

Decision trees may also be used as a simple representation of induced rules for classification. Starting at the single root node, the classification system selects a particular branch from each successive node depending of the value of a single attribute of the case to be classified. At each leaf in the tree, there is an identifier for the class to which the examined case belongs.

The paths through decision trees are easily followed by a human, but they have the disadvantage of growing large for real applications, making them difficult for humans to gain knowledge from. On the other hand, decision trees are a fast method of performing automatic classification after the tree has been induced.

Decision trees vary in the types of questions that can be placed in a node. The most common type of decision tree is one which allows axis parallel splits, i.e. the question at a node may only refer to one attribute such as the ones shown in the example e.g. $A1>c$ where $A1$ is an attribute and $c$ is a constant. A more accurate representation of reality can be achieved by using oblique decision trees. These allow linear expression such as $A1>A2+c$ where $A1$ and $A2$ are attributes and $c$ is a constant. Where the actual splits to be modelled are not parallel to the axes, this produces smaller trees which model reality better, but there is a significant increase in the search effort required to generate oblique trees, which would generally be prohibitive for large databases.

In a similar vein to the decision tree, regression trees follow a series of decision nodes in a tree, but instead of class identifiers at the leaves, there are predicted values for a real valued variable.

Production rules are propositional-like rules which form an if-then statement. These can be simpler for humans to understand than decision trees, as each rule is a self contained item of knowledge. As an example consider a set of rules for deciding if the weather conditions are right for operating a piece of outdoor equipment.

IF humidity=high AND windy=true THEN class=Don't operate

IF outlook=rain AND windy=true THEN class=Don't operate

DEFAULT class=Operate

The order in which production rules are applied may be important if the conditions for any two rules overlap, as they do not then uniquely classify the overlapping examples. There are standard methods for transforming decision trees into production rules, which may even improve their classification performance.

Decision lists are a more formal form of the production rules mentioned above. Decision lists strictly generalize decision trees and rules in conjunctive and disjunctive normal forms. They are formed from a list of terms which are pairs of an elementary description and a class. The last description in the list is true followed by the default class. The list is run through in order, with the classification of the example being taken from the first pair where the description is true. Generally the early terms are exceptions and the later terms are general patterns.

Ripple-down Rule Sets are a more flexible form of the decision list. When there is a rule of the form "if A then B unless C" then the exception placed in a decision list comes before the general rule, but is global. This lack of locality limits the descriptive power of the representation, and makes it harder to understand. For ripple-down rule sets the exceptions for each rule are held locally within the term.

First order logic is a representation which has greater expressive power than the previous ones. However, this increase in expressiveness also means that the search space for the induction algorithm is also significantly increased. To handle this, a reduced form of FOL and/or good heuristics are used.

Semantic nets, an uncommon representation, take the form of specialization/generalization graphs which represent example. Data mining is typically performed by graph manipulations.

Frames and schemata representations use hierarchical tables of data for each example. A table can have a subtype field which refers to a more general frame, e.g. person will have an "is a mammal" field. The frame at the lower level of the hierarchy inherits the details of the super-type, but can override any of its values with a different one.

Neural networks, modeled on the brain's neural structure, consist of sets of interconnected neurons which have many inputs but only one output. The connections have weights which are adjusted over time whilst learning is in progress.

Although neural networks have the advantage that performing well over a wide range of problems, there are several potential disadvantages. It can be difficult to directly incorporate domain knowledge or explain the operation of the generated net; hence neural networks may not be entirely useful for descriptive tasks. Human confidence in the predictions produced by a neural network can also be low due to the fact that the network does not explain its decision. Although neural networks operate relatively quickly once trained, the training times and the number of training examples required can be significant.

Bayesian Belief Networks (BBN) are a method of quantitatively representing the dependencies between discrete valued attributes. A belief network takes the form of a Directed Acyclic Graph (DAG), with the nodes representing attributes, and the arcs representing dependencies between attributes. Each node contains a (possibly multidimensional) table of conditional probabilities, representing the probabilities of the variable taking each of its values with respect to the values of all of its parent nodes.

It is possible to transform or interchange data between some of the above representations, and thus enabling the use tools designed for a different data type.

Converting decision trees into production rules is a common example of a transformation. The conditions for reaching any leaf in a decision tree can be found by following the tree from its root to the leaf, noting the questions and answers at each decision node. Production rules can be generated by rewriting each of the leaves with the steps from the root node as the condition of a production rule. As these rules were generated from a tree, there will be no overlap in the classes predicted by the rules. The rules can then often be generalised by removing irrelevant conditions, which may even improve the classification accuracy of the system. For C4.5 rules, the division caused by each condition in the rule can be examined and the significance of this happening by chance can be tested.

Classification is by far the most commonly addressed task in KDD. Various algorithms have been proposed for performing classification. Algorithms typically have a learning phase and an operational phase. In the learning phase, the algorithm is given examples in a tuple format which contains a class identifier. The algorithm will then produce some representation of this information which can be used in the operating phase. In the operating phase, the algorithm is provided with tuples which do not contain a class identifier, it then gives its estimation of the correct class for each example.

Axis-parallel Decision Trees (and Production Rules).

One well-known data mining algorithm, referred to as C4.5 is an extended form of the ID3 family of algorithms. C4.5 uses axis-parallel decision trees and production rules representations. It is used to greedily induce axis parallel decision Trees which classify the data into the provided classes.

One possible limitation with C4.5 is that the algorithm can only induce hyperrectangular regions with respect to the attributes, i.e. it only produces axis-parallel splits. If the classes are actually separated by say a diagonal line, C4.5 will approximate this with rectangles. The signature of this condition is the unlimited growth of the decision tree as more training cases are added, with a roughly constant error rate.

One method of addressing this is to allow more than simple threshold tests (e.g. X>10), such as expressions which contain a weighted (linear) combination of attributes (e.g. Sigma i for $W_i.A_i > Z$). For the straight line Y=mX+c, this test would be of the form Y−mX>c. These oblique decision trees are not supported by C4.5, however, even for the linear cases this can slow down tree building by an order of magnitude.

The Classification And Regression Trees (CART) algorithm is another well-known algorithm that produces decision trees. Dating from the 1970s, it has undergone improvement in the statistical measures used to create the tree, but still produces a standard decision tree. It operates well on ordered or discrete valued attributes. To reduce the search effort required to form the tree, CART limits itself to axis parallel splits, thus producing trees faster but with oblique splits being approximated by several axis parallel splits. As will be hereinafter discussed, CART can be adapted to address the task of regression.

An algorithm called OC1 describes the Induction of decision trees, but instead of the normal axis parallel splits, OC1 makes general planar splits, producing an oblique decision tree. While this is a more general system producing better approximations of reality, it does require a greater induction time. Where n is the number of examples and d is the number of attributes per example, the worst case operation of axis parallel tree induction is $O(dn^2)$, whereas OC1 takes $O(dn^2.\log(n))$ time. However, there is no information available which describes the difference in average case operation.

There are numerous well-known neural network methodologies for classification. These fall into the supervised learning category, where the classes are provided for the training set of data, and the networks learn to produce the same classification. There are several common methods for changing the weights in neural nets: backpropagation; conjugate gradient optimization; and variable metric optimization.

There is an important theoretical result for classification using neural networks. The Perceptron Convergence Theorem proves that a perceptron with a single neuron will converge to a state where it can differentiate between 2 classes separated by a hyperplane.

The K Nearest Neighbour (KNN) algorithm uses examples of the particular classes directly to predict which class a given example belongs to. It can take two distinct forms, both of which use an integer parameter K, which must generally be tuned on a per database basis.

The pooled form of KNN sorts the distances between the point to be tested and each of the given examples, and then considers the K shortest. It determines the class for the query as the class which appears most commonly in the K nearest neighbours. The grouped form considers C different volumes around the point whose class is queried, where C is the number of possible classes. In each of these C cases, the volumes are expanded until they contain K examples. The selected class is the one with the smallest volume. This technique must directly store each of the training examples that it is given, and must be given a large number of examples to delineate borderline cases. As such it uses a significant amount of the available storage and CPU resources.

The CART algorithm discussed above can be adapted to address the task of regression. Instead of holding a class identifier, the tree formed by this method contains a value at each node, usually the average value of all of the cases contained beneath it. The tree is formed in exactly the same way as before, but often with a different measure of the purity of a class (such as least squares). The examples are classified by starting at the root node and following the required path to a leaf. The example then receives the value contained in the leaf node.

Unlike classification algorithms, clustering algorithms only have the learning phase: once the classes have been learnt then the task is complete. As such, generally algorithms should take in a set of tuples without a class identifier, and output either a set of tuples with the identifier added, or several sets of tuples separated into the classes.

AutoClass III is a commercial clustering product, which was developed at the NASA Ames research center. AutoClass III relies heavily on complex statistical methods, using Bayesian conditional probabilities (cf. Bayesian Belief Networks) and attempts to find the most probable set of class descriptions from the provided data and prior expectations. The prior expectations provide a way to limit class complexity, since without this important attribute, the best fit for a dataset of size N would be N different classes with only one example in each. While this accurately describes the data, it is not a particularly useful discovery. In all practical applications so far, this method limits class complexity extremely effectively.

The output of AutoClass III is unusual. Instead of giving a definite class for each individual example, it provides the probabilities for the example belonging to each class. An obvious conversion to definite classes would be to select the class with the highest probability for each example.

The KNN algorithm presented for classification above can be used for classification in the loosest sense of the word. The user selects K examples, one for each class that he requires. The remaining data is then clustered around these points as before. There are similar algorithms, such as Continuous K-Means which perform clustering in a similar manner, using different statistical measures of similarity. While this is a method of clustering data into classes, it does not discover those classes itself. This reduces its usefulness and brings into question whether it is really clustering or an application of classification.

To a certain extent, the results of other data mining tasks could also be considered as summarization, since they produce compact representations of the data. There are several known systems which contain algorithms for summarization.

One known summarization algorithm combines data mining with inductive logic programming. It requires domain knowledge to be provided in the form of Prolog clauses, and a definition of the search space in first order logic clauses. This requires more knowledge of the data than is generally available for databases.

DBMiner is a large commercially-available DM system which includes many algorithms and uses its own query language DMQL. It contains methods for characterizing the data, but these appear to be interactive with the user deciding what can be pruned and aggregated.

EMERALD is another commercially-available collection of data mining tools which includes a tool for discovering rules which characterize sequences. It appears to be mainly a teaching tool, concentrating on user interface, where the induced rules are spoken by a speech synthesiser.

Bayesian Belief Networks (BBNs) provide a quantitative representation of dependencies between attributes in a database. Algorithms for this task often leave the task of drawing the dependency graph to the user as humans have been shown to handle the task well, often better than the automated equivalent. Most databases have few enough attributes to be handled in this manner.

The conditional probabilities are most commonly learned by simply flowing the available data through the network, counting the number of cases that fall into each category, and then dividing this count by the total number of cases in the database. However, other approaches to this task, such as neural networks, have often been shown to outperform the counting method when the goal is an intentional representation of the links such as a formula, rather than the probability tables.

Interpretation of Results

Once the data-mining algorithm has completed, the results must be interpreted, as represented by block 46 in FIG. 3. The interpretation may be specific to the algorithm in question, but in general, some form of assessment of the results will be required to validate the results, for example use of a test record set to assess a trained neural network.

The analyst may also make use of visualization tools, statistical packages or the results of other data mining algorithms to assess the quality of results.

Once confirmed, the results must be converted somehow into knowledge. This may mean, for example, taking a set of induced rules and generating a knowledge base, producing a report from a decision tree, or producing a classification application from a trained neural network.

Consolidate Knowledge

The final stage of KD process 30 in FIG. 3, represented by block 50, is knowledge consolidation. To consolidate the discovered knowledge it must be:

Reported

Documented

Acted on

Fed back into knowledge discovery process 30.

System Requirements

As noted above, for KD system 30 to be useful, it must provide support for all stages in the KD process. It should preferably also support the loops and iterations that occur during the execution of a KD plan.

The richer the set of algorithms and tools that can be made available to the user, the more powerful the system will be in terms of the number and complexity of problems that can be solved. This, however, must be balanced against the increased learning curve required for such a system. The solution is to make the system a framework based on plug-in Components.

KD system 30 should also preferably integrate with the tools that are already used by the analyst (but fall outside the scope of system 30 itself). For example, visualization tools are used at almost every stage of the KD process. It would be a major advantage if such tools integrated seamlessly with KD system 30. Statistical packages and database report writers are other examples of such "third-party" tools.

The following list specifies, at a very high level, the major functionality that Framework 62 of Knowledge Discovery process 30 should support:

Input data from many database vendors

Incorporation of outside knowledge

Sub-division of the data population into subsets

Helping the user to:

reduce the number of records that need to be mined reduce the number of data dimensions Cleansing of messy data Multiple data mining techniques and algorithms The generation of actions to external systems System Overview A "framework" is a set of related operations that can be configured to solve a set of problems in a particular domain. In this case, a framework 62 (to be described herein in further detail with reference to FIG. 5) will be used to serve KD applications. For example, framework 62 could be used for a very general purpose KD system, supplying a broad range of KD components to the user. The same framework, however, could be configured as a very specific application, only providing the essential components to solve a particular problem. By modeling KD process 30 as a framework, the system can support both of these scenarios.

Each component of KD process 30 implements a single KD task. For example, a data source component will be used to retrieve a data set from a database. A data-mining component will be responsible for finding patterns from its input data set. By linking these components together, the user will be able to describe each step in the KD plan, from data selection through to results generation.

Figure 4:
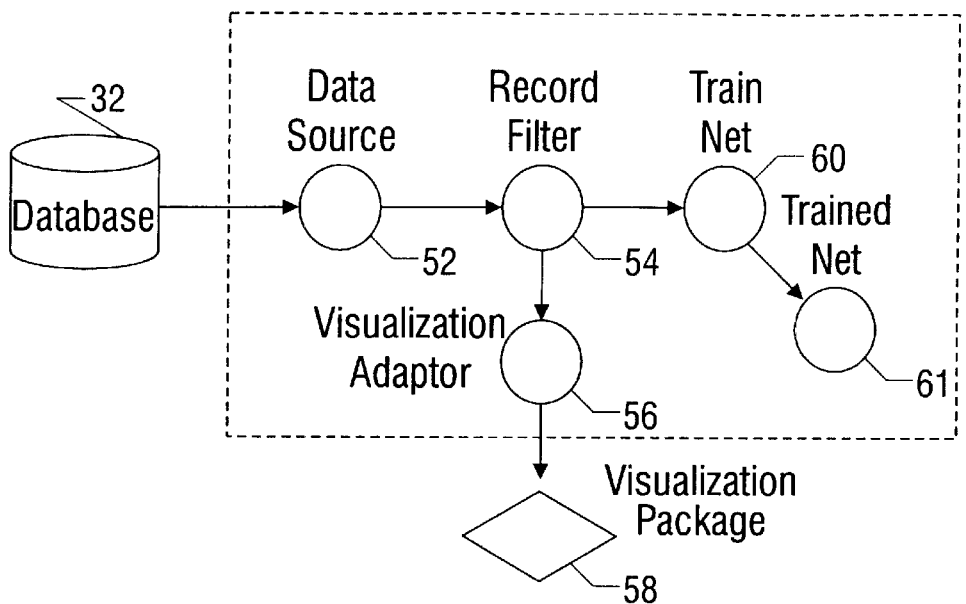
FIG. 4 is a block diagram illustrating a typical process plan defined for the knowledge discovery process from FIG. 2.

FIG. 4 illustrates an example KD process plan in accordance with the presently disclosed embodiment of the invention.

Records are extracted from a database using a data source component, represented in FIG. 4 by block 52. As those of ordinary skill in the art will appreciate, associated with data source component 52 will be attributes containing the information necessary to access the database (for example, user name and password). Another attribute will use the query (for example, an SQL "select" statement) that will specify the required data records.

These records then pass through a record filter component, represented by block 54. This component will reduce the record set based on some user-specified criteria, for example sample 10% of the data at random.

As shown in FIG. 4, there are now two paths out of record filter component 54: One passes the remaining records to a visualization adapter component represented by block 56. This component converts the records into the format required by a separate visualization tool, represented by block 58, that will allow the user to inspect the data set at this point in the process.

The second path from record filter component 54 leads to a neural network training component represented by block 60. This will use the records it receives as input to produce a trained model of the data. Note that this component does not transform the input data in any way, and does not feed on to any subsequent components. Instead, network training component 60 produces a new component, a trained neural network 61, which can then be used in subsequent KD plans. For example, a subsequent plan could be to test the trained neural network against another data set to ensure that it has been trained properly.

Figure 5:
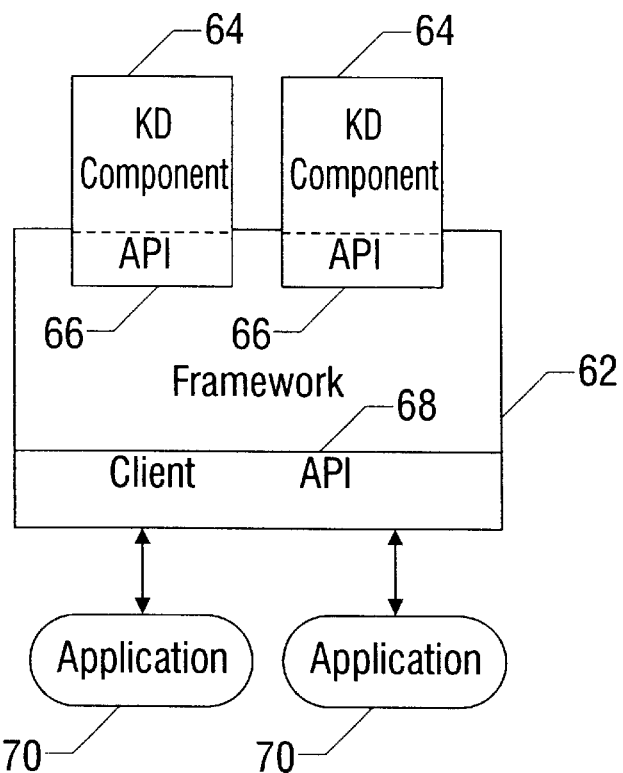
FIG. 5 is a block diagram illustrating the software architectural framework of the knowledge discovery process of FIG. 2.

A representation of a KD framework in accordance with the disclosed embodiment of the invention 62 is shown in FIG. 5. It cannot be known in advance all of the KD components that framework 62 will have to support. Framework 62 is therefore preferably extensible, in that new components 64 can be made available as "plug-ins." (As used herein, reference numeral 64 shall be used to refer to KD components generally, although in specific examples, such as that of FIG. 3, specific components may be designated with unique reference numerals.) In order that the development of components 64 is separated from the development of framework 62, components 64 are preferably wrapped in an open application programming interface ("API") 66 which those of ordinary skill in the art will understand provides an interface by which components 64 can communicate with framework 62 and with one another. This means that components 64 will conform to a well-defined and public interface. Any component 64 that provides that interface will plug into framework 62. Framework 62 preferably will not make assumptions about the internal processing of any component 64. Likewise, components 64 are preferably designed so as to not make calls to framework 62. Instead, each component 64 is passive until framework 62 calls it via API 66. Framework 62 takes care of structure, flow of control and calls to the system API 66.

Framework 62 exports a client API 68; API 68 is used by application programmers to develop systems 70 based upon Framework 62.

Functional Specification

The following sections describe in detail the functionality that framework 62 in accordance with the presently disclosed embodiment of the invention supports. These functions are divided into the following sections:

Data Library

Knowledge Discovery Components

Component Registry

Plan Registry

Business Data Dictionary

Distribution Network

Defining Process Plans

Plan Scheduling

Plan Distribution

Plan Monitoring.

Error Handling

Data Storage

Data Library

Framework 62 provides the raw data types to be transported between KD Components. In addition, framework 62 provides combinations of the raw data types into structures. Framework 62 allows user-provided combinations of the raw data types into new data structures to be used. The raw data types and data structures will be collectively know as the Data Library. This is described in further detail below.

A mechanism is provided for a Business Data Dictionary (to be described hereinbelow) and KD components 64 to access the data types and structures in the Data Library. Only data records comprising of the raw data types provided by framework 62, or combinations of them, may be transported between components. These data records are referred to herein as "tuples."

Framework 62 supports a mechanism for random access of tuples by grouping them together. This is referred to as a "table." Framework 62 further supports the definition of supplementary information about tuples, e.g. to define which fields within a tuple can be acted-on by the data mining algorithms and which should not. Framework 62 supports a mechanism to correlate the tuples being transported throughout the system with the Business Data Dictionary Domains, as will be hereinafter described in further detail.

Knowledge Discovery Components

Various types of KD Components 64 are contemplated, including without limitation, the following:

Data Source components to inject data into KD Framework 62 from external sources, for example, to read data from a database or file of known type. Database type that are preferably supported include the well-known JBDC standard format, the ODBC standard format, and the Comma Separated Value ("CSV") format.

Data Reduction components to enable the user to reduce the dataset size. Such components can reduce both the number of data records and the number of dimensions (fields) in each record.

Data Transformation components, to allow the user to transform the data using various techniques such as scaling data into a given range, merging data from multiple sources, and performing arbitrary expressions on the data.

Algorithm components to provide machine learning and statistical techniques to analyze the data for various KD tasks such as association, classification, and so on. Various techniques are known for this type of processing, along with methods for determining the accuracy of the trained algorithms.

Data Sink components to perform the opposite function of data source components, i.e., to save or send out data from the framework to files in various known or defined formats.

Component Registry

Framework 62 in accordance with the presently disclosed embodiment of the invention maintains a store of available components 64, referred to as a Component Registry. Components 64 within the Component Registry are preferably uniquely identifiable. The Component Registry has two main functions: it stores configuration information about each KD component 64 within it, and it stores descriptive information about each KD component 62 within it.

The following functions will be available on the Component Registry:

Import a new KD component 64 from outside framework 62.

Export an existing KD component 64 from the framework 62.

Add a new version of a component already in the Component Registry with updated configuration information.

Remove a component 64 from the Component Registry.

Retrieve a component 64 from the Component Registry for use in a Process Plan, to be described below Retrieve the descriptive information relating to a specified component 64.

User Access

The Component Registry allows allocation of components 64 to an area public to framework 62. Further, the Component Registry allows the addition of access control information to components 64 in the public area of the registry. The Component Registry allows the allocation of components to an area private to a specific user. Other users will not have access to the components in the private area of another user. It is preferably possible to copy a component 64 from a private area of a given user to the public area of the Component Registry. A user is able to get a list of all components 64 to which that user has access in both the public and private areas of the Component Registry. Framework 62 will provide information to indicate if a given KD Component is from the public or private areas of the Component Registry.

All users connected to framework 62 are preferably informed of any updates to the Component Registry that are relevant to the user. For example, all users will be informed of changes to the public area of the Component Registry and changes to that user's private registry, but not of changes to the private registry of another user.

Plan Registry

Framework 62 maintains a store of the available Process Plans (described below). This store is referred to as the Plan Registry. KD Process Plans within the Plan Registry are preferably uniquely identifiable.

The Plan Registry will store configuration information about each Process Plan within it.

The following functions will be available on the Plan Registry:

Import a new Process Plan from outside framework 62.

Export a Process Plan from framework 62.

Add a Process Plan to the Plan Registry.

Update a Process Plan in the Plan Registry.

Remove a Process Plan from the Plan Registry.

Retrieve a Process Plan from the Plan Registry.

User Access

The Plan Registry provides for the allocation of Process Plans to an area public to the framework 62. The Plan Registry enables the addition of access control information to Process Plans in the public area of the Plan Registry. The Plan Registry allows the allocation of Process Plans to an area private to a specific user. Users will not have access to the plans in the private area of another user. It will be possible to copy a Process Plan from the private area of a given user to the public area of the Plan Registry. User are preferably able to get a list of all Process Plans that the user has access to in both the public and private areas of the Plan Registry.

Framework 62 will provide information to indicate if a given Process Plans is from the public or private areas of the Plan Registry. All users connected to Framework 62 will be informed of any updates to the Plan Registry that are relevant to the user. For example, all users will be informed of changes to the public area of the Plan Registry and changes to that user's private registry, but not of changes to the private registry of another user.

Business Data Dictionary

The goal of the Business Data Dictionary (BDD) is to support the incorporation of additional information about the data being accessed by framework 62. It is contemplated that this information should aid users of framework 62 in understanding the data, and assist components 64 in making better use of the data.

In accordance with a significant aspect of the invention, the Business Data Dictionary provides a mechanism for storing and using domain knowledge about the data used in the KD process, as well as describing the format of potential data sources.

Figure 6:
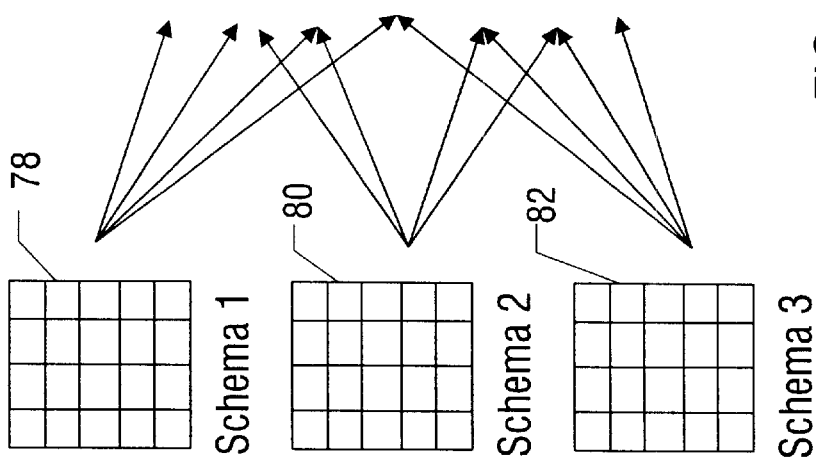
FIG. 6 is block diagram showing the components of a business data directory maintained by the knowledge discovery process of FIG. 2.

FIG. 6 is a diagrammatic illustration of a BDD 72 in accordance with the presently disclosed embodiment of the invention. BDD 72 holds source descriptions (referred to herein as "BDD Sources") whose purposes are to point to individual sources of data for use in KD process 30. In FIG. 6, two BDD Sources 74 and 76 are shown, although there is no theoretical limit to the number of sources available. For example, BDD Sources such as 74 and 76 may be individual databases or external files. BDD Sources 74 and 76 each reference one or more BDD Schemas (to be described below in further detail) that describe the organization of the data within a particular BDD Source. For example, this could be a description of the tables and fields within a database. The separation of BDD Sources and BDD Schema enables multiple sources referencing data of the same format to use a common schema description. In FIG. 6, three BDD Schemas 78, 80 and 82 are shown, although, again, there is no theoretical limit to the number of Schemas defined.

In accordance with another significant aspect of the invention, each field in a BDD Schema contains data items of a specific type which may be used by KD process 30—a BDD Domain. The BDD Domain for a type contains meta-data about how this type can be used for knowledge discovery such as the operations which can be performed on it, attributes of the type such as the range of values that it can take, and a textual description of the type.

Source Data Description

Framework 62 preferably allows the user to add descriptions of the source data that may be accessed in a KD Process Plan. This will be known as a BDD Source. A user may remove descriptions of the BDD Source data, update descriptions of the BDD Source data, and retrieve descriptions of the BDD Source data.

BDD Source Schema

A BDD Schema defines the logical view of the format of data within a BDD Source. Framework 62 preferably allows users to add descriptions of the schema of the BDD Source data. This is referred to as a "BDD Schema." Framework 62 allows users to remove descriptions of the BDD Schema of the BDD Source data, update descriptions of the BDD Schema of the BDD Source data, and retrieve descriptions of the BDD Schema of the BDD Source data.

BDD Domains

Framework 62 in accordance with the presently disclosed embodiment of the invention provides a mechanism for allowing one or more source data items to be mapped to a single representation of that data. That is, it is possible for there to be a single data representation for many data sources. This single representation will be known as a "BDD Domain." Each BDD Domain is identified by a unique name has a textual description. The mapping of source data to a BDD Domain is preferably done on a per-user basis. That is, different users of framework 62 are able to map the same source data to different BDD Domains.

A BDD Domain represents the application-specific details for a logical collection of data items and is used to further specialize a particular data type. For example, "Integer" would be a very general BDD Domain, whereas "Ranking_1_to_5" would be a specialization of this BDD Domain which could indicate, for example, the relative importance of some item. Although these two BDD Domains are both integers, they have different attributes and may have different operations performed on them. For example, a these BDD Domains have different ranges of values, and the "Ranking_1_to_5" BDD domain would not usually be subject to mathematical operations. This is one example of the type of "meta-data" information maintained in the Business Data Directory.

Framework 62 will allow the schema of the source data to be mapped separately from the description. This will enable the physical location of the database to be modified without creating new source descriptions. Framework 62 allows users to add new BDD Domains, remove BDD Domains, update BDD Domains and retrieve BDD Domains. It is preferably possible to specify that a BDD Domain inherits the characteristics of another BDD Domain, i.e. a "parent" domain and "child" domain. Further, in one embodiment it is possible to specify that only certain characteristics of the parent domain are inherited by the child domain.

Domain Characteristics

Framework 62 allows users to add new operations that may be applied to a BDD Domain. Framework 62 allows users to remove or retrieve operations that may be applied to a BDD Domain. Each BDD Domain operation preferably has a textual description. Framework 62 preferably allows users to add arbitrary information relating to a BDD Domain, e.g. default values, value range, and to mark data as not to be used in algorithm learning. A user may remove, update, or retrieve such information relating to a BDD Domain. KD components 64 have access to the domain information for any data item that is presented to the component as input or configuration data.

Distribution Network

In one embodiment, framework 62 is capable of executing KD Process Plans on a defined network of host machines. This is referred to as a Distribution Network. Framework 62 provides the functionality to add, remove, and retrieve host machines to the Distribution Network. Each host in the Distribution Network will be available for a number of given times for each day of the week.

Defining Process Plans

Framework 62 provides the functionality to create multiple new KD Process Plans. Each user will have the ability to create and execute multiple Process Plans concurrently. A Process Plan that is loaded into framework 62 is referred to as an Active Plan. Each user will be able to remove a Process Plan from the list of currently Active Plans for that user. Framework 62 preferably provides the functionality to insert the entire contents of one KD Process Plan to another.

KD Components

Figure 7A:
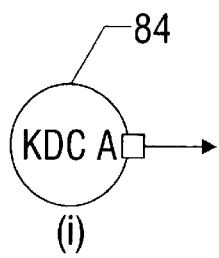
FIGS. 7a through 7h are block diagrams showing components of the knowledge discovery process from FIG. 2; in particular.
Figure 7B:
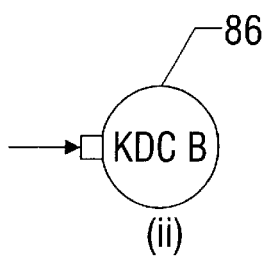

Framework 62 provides the functionality to add and remove KD Components 64 from the Component Registry to a Process Plan. Each KD Component 64 has zero or more inputs to receive data from other components. A component with zero inputs but at least one output is referred to as a Data Source. A Data Source component is designated with reference numeral 84 in FIG. 7a. Similarly, each KD Component 64 has zero or more outputs to send data to another component 64. A component with zero outputs but at least one input is referred to as a Data Sink. A Data Sink component is designated with reference numeral 86 in FIG. 7b.

Figure 7C:
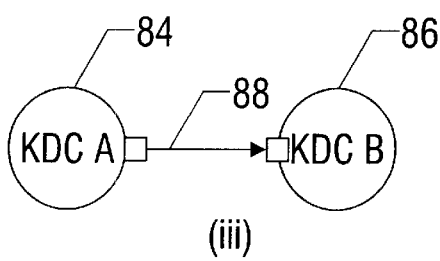

In accordance with one aspect of the invention, it is possible to connect the data input and output of any two KD Components together, provided they can send and receive compatible data types. This is shown in FIG. 7c, wherein component 84 provides its output to component 86. This will be known as a Data Link, with one such Data Link being designated with reference numeral 88 in FIG. 7c.

Configuration information of a KD Component 64 may be taken from KD Storage. This is referred to as an Initialization Link. Further, It is possible to specify that result(s) from a KD Component be stored in KD Storage. This will be known as a Result Link.

KD Component Information

KD Components 64 support the following functions regarding information about the component: Retrieve the descriptive information relating to the component; add arbitrary configuration information to the component; remove configuration information from the component; update the configuration information relating to the component; retrieve the configuration information relating to the component; report the state of the component; report the configuration information of the component; report warnings from the component; and report errors from the component.

Data Links

Figure 7D:
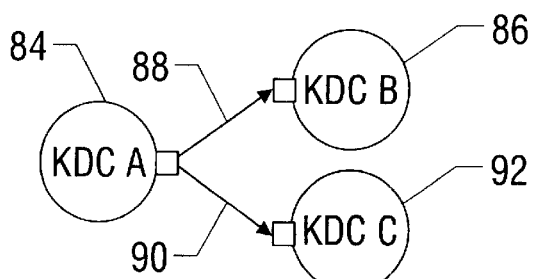

In addition to creating a link between the output of one KD Component 64 and the input of a second KD Component, as discussed above with reference to FIG. 7c, it is also possible to add multiple Links from any output of one KD Component 64 to the respective inputs of more than one other KD Component 64. An example of this is shown in FIG. 7d, which shows a first link 88 coupling the output of Component 84 to the input of Component 86, and a second link 90 coupling the same output of Component 84 to the input of a third component 92.

Figure 7E:
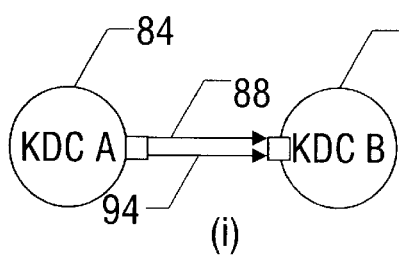

In accordance with one aspect of the invention, some linking configurations are not permitted. For example, it is not permissible to add more than one Data Link from the same output of a KD Component 64 to the same input of another KD Component. An example of this type of impermissible linking is depicted in FIG. 7e, which shows two links 88 and 94 between the output of Component 84 and the input of component 86.

Figure 7F:
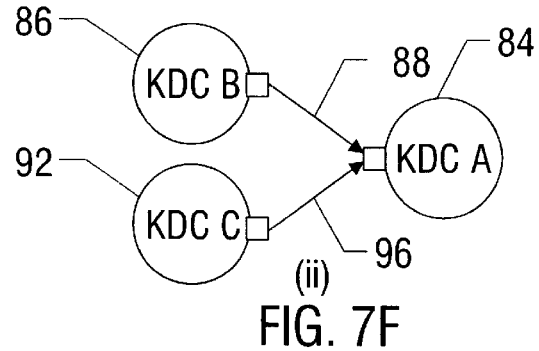
Figure 7G:
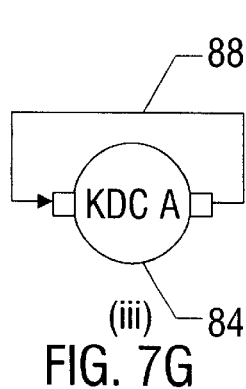
Figure 7H:
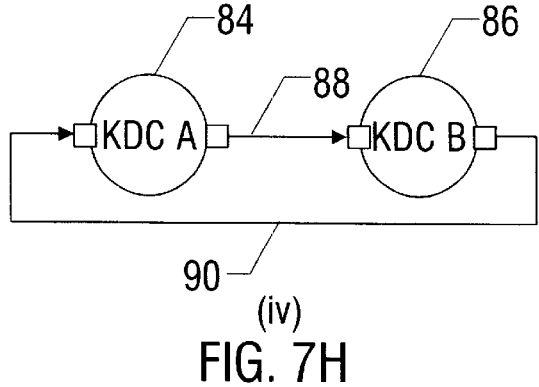

Another example of an impermissible linking arrangement is depicted in FIG. 7f, which shows the outputs of two Components 86 and 92 being linked to a single input of Component 84. Likewise, it is not permissible to link the output of one Component directly to its own input, as depicted in FIG. 7g. Links which result in circular loops are also impermissible. An example of this is shown in FIG. 7h, which shows the output of Component 84 linked to the input of Component 86, whose output, in turn, is linked to the input of Component 84.

In accordance with one aspect of the invention, a Data Link may be specified to be capable of caching data passing across it. That is, a Data Link may create and store a "local" copy of data travelling across the link. This is described in further detail below. Any KD Component 64 that has an input connected to a Data Link supporting caching will be able to access the data cache as specified by Framework API 66.

Data Link Information

A user is preferably provided with the capability of adding, removing, updating and retrieving configuration information to a Data Link.

Initialization Links

Figure 8:
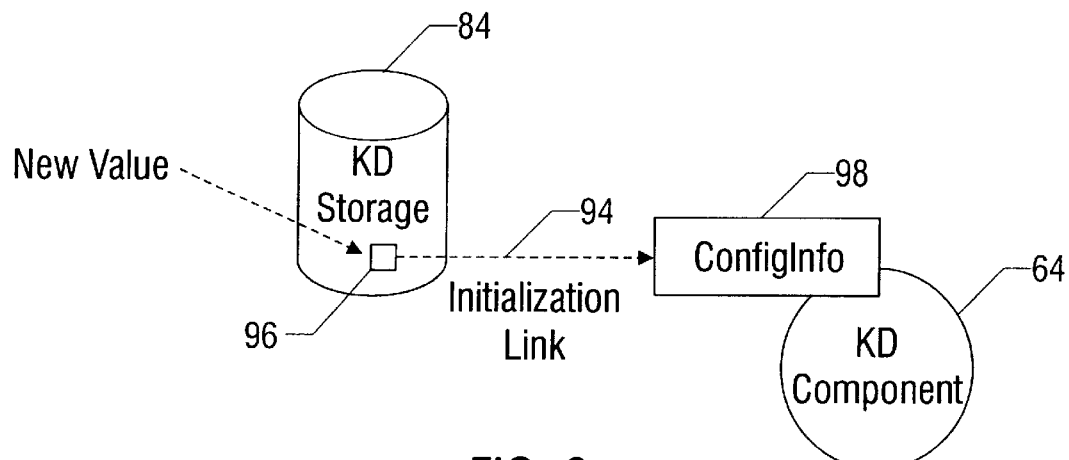
FIG. 8 is a block diagram showing an initialization link between a data source and a component of the knowledge discovery process from FIG. 2.

When the contents of a KD Storage location are changed, and the location has an Initialization Link on it, KD Storage will report that the contents of the location have changed. FIG. 8 shows an initialization link 94 between the output of KD Storage component 84 and another KD Component 64. When the contents of a location 96 in Storage Component 84 are changed, configuration information 98 associated with Component 64 is updated via initialization link 94.

In one embodiment, a user is able to add or remove an Initialization Link such as link 94 in FIG. 8 to an item of configuration information of a KD Component. It is not permissible to add more than one Initialization Link to the same item of configuration information of a KD Component 64.

Result Links

Figure 9:
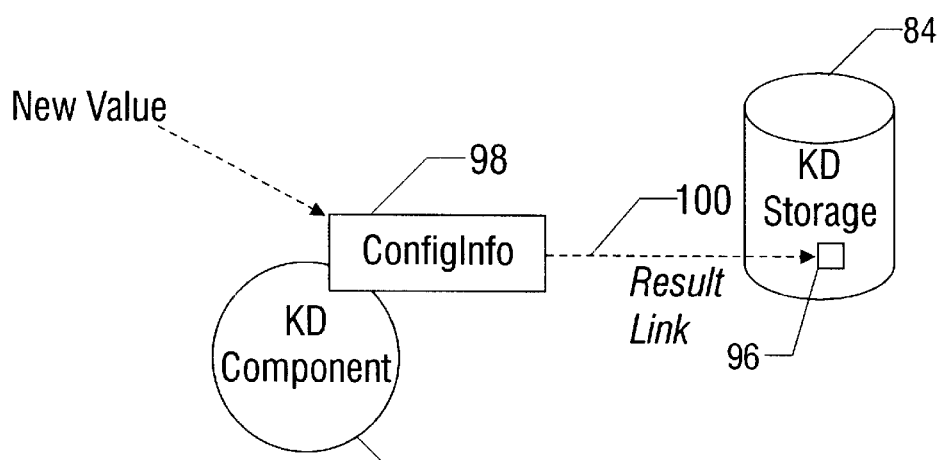
FIG. 9 is a block diagram showing a result link between a component of the knowledge discovery process from FIG. 2 and a data sink.

Conversely, when the contents of an item of KD Component configuration information changes and the configuration information has a Result Link on it, the contents of the specified location within KD Storage will be set to the value of the configuration information. FIG. 9 shows a Result Link 100 between KD Component 64 and KD Storage Component 84. When the configuration information for component 64 changes, the appropriate location in Storage Component 64 are updated via Result Link 100.

In one embodiment, a user can add or remove a Result Link such as Result Link 100 in FIG. 9 from a result of a KD Component. It is not permissible to add more than one Result Link to the same location in a KD Storage Component.

Verification

Data Links in a Process Plan are validated by checking that the format and type of data at the originating end of the link is of a suitable format and type for the terminating end of the link. That is, the data generated by the output of a source KD Component is accepted by the input of the destination KD Component.

Initialization Links in a Process Plan are validated by checking that the type of data in the KD Storage location is of a suitable type for the configuration information of the KD Component.

Result Links in a Process Plan are validated by checking that the type of data of the result of the KD Component is of a suitable type to be stored in the given location of KD Storage.

Plan Information

Framework 62 provides the functionality to add, remove, update, and retrieve configuration information relating to a KD Process Plan.

Storage

Framework 62 will provide the functionality to load and save Process Plans from a file, a KD Storage Component, or the Plan Registry.

Plan Scheduling

The user is able to start, stop, suspend, and resume a Process Plan. Framework 62 determines a start time for each KD Component based on the availability of the host in the Distribution Network on which the component is to execute. Framework 62 schedules a start time for the Process Plan based on the latest start time of the KD Components within the plan. Framework 62 schedules KD Components within a Process Plan to be suspended if the host on which the component is executing becomes unavailable. Framework 62 schedules KD Components within a Process Plan to be resumed once the host on which the component is executing becomes available.

Sub-Plan Scheduling

In the presently disclosed embodiment, Framework 62 supports a scheduling mechanism whereby only those parts of a Process Plan that have been modified are re-run in any subsequent run of the plan (as long as the Process Plan remains an Active Plan). Framework 62 further preferably supports a mechanism to allow the user to specify that certain parts of a Process Plan must be re-run in the subsequent run of the plan, even though that part of the plan has not been modified. Framework 62 also preferably supports a mechanism to allow the user to specify that the entire Process Plan must be re-run in the subsequent run of the plan, even though parts of the plan have not been modified.

Plan Distribution

When a KD Component 64 is added to a plan, it will be created on a default host machine that can be specified for each user. The user will be able to specify on which of the hosts in the Distribution Network a given KD Component 64 is to execute. Framework 62 will distribute KD Components to the specified hosts when the Process Plan is scheduled to start execution.

The foregoing requirements may be over-ridden if the given KD Component 64 is not available in a form to be created or executed on the specified host machine. For example, the component 64 may be written in a native language for a limited number of platforms.

Native KD Components

In the presently preferred embodiment, KD Components 64 may be written in the Java™ language. Components 64 not written in the Java™ language may be supported to the extent that they comply with the Java™ Native Interface (JNI) and the Core Component interface.

CORBA KD Components will be supported if the component complies with the CORBA Interface Definition Language (IDL) specified by Framework 62. KD Components preferably provide configuration information specifying on which platforms and host machines in the Distribution Network the component is available to be created and executed.

Transport Mechanisms

Framework 62 determines the physical transport mechanism for each Data Link between KD Components in a Process Plan. The Data Link connections between components are preferably not fixed to any given transport mechanism. In the disclosed embodiment, Framework 62 supports Java™ Method Invocation for Data Links between two KD Components written in the Java™ language and executing.on the same host.

Framework 62 supports a Java™ socket communication mechanism for Data Links between two KD Components written in the Java™ language and executing on different hosts.

Framework 62 also preferably supports the reception of data from a CORBA Source KD Component as well as the transmission of data to a CORBA Sink KD Component.

Data Caching

In accordance with a significant aspect of the invention, caching of data between executions of a Process Plan is preferably supported such that a Process Plan may be re-run without requiring that every component in the plan is run again. Components whose data output would not be modified from that of the previous run need not be run again.

Caching of data in memory and to disk is possible when a Process Plan is executing. A single cache as described above will support delivery of the cached data to multiple KD Components.

Plan Monitoring

Plan Status

KD Components in a Process Plan will report information on the component state changes to the user of the plan. This status will indicate if the component does not have all of the required configuration information, is currently executing, is suspended, has terminated due to an external action; has terminated normally, or has terminated due to an error. Process Plans report information on the current state of the plan to the user of the plan if the state changes. This status will indicate if the plan is ready to be started, is currently executing, is suspended, has terminated due to an external action, has terminated normally, or has terminated due to an error.

Configuration Information

KD Components 64 in a Process Plan report any changes to the component configuration information to the user of the plan. Process Plans report any changes to the plan configuration information to the user of the plan.

Warnings/Errors

KD Components in a Process Plan report any warning and error messages that occur during the configuration and execution of the component to the user of the plan.

Updating Process Plans

Plan

The user of a Process Plan can add, remove, or update configuration information relating to a KD Process Plan while it is executing or suspended.

KD Components

The user of a Process Plan can add and remove KD Components 64 to a Process Plan while it is executing or suspended. Further, a user add, remove and update arbitrary configuration information to a KD Component 64 while it is executing or suspended.

Data Links

The user of a Process Plan can add and remove Data Links while the plan is executing or suspended. Further, a user can add, remove or update configuration information for a Data Link while the Process Plan is executing or suspended.

Initialization Links

The user of a Process Plan can add and remove Initialization Links to a Process Plan while it is executing or suspended.

Results Links

The user of a Process Plan can add and remove Result Links to the plan while it is executing or suspended.

Error Handling

Error Handling Policy

Framework 62 will only report errors that it cannot handle internally. KD Components 64 will only report errors that they cannot handle internally.

Users

The user of a given session will receive reports of all warnings and errors related to that session. The user of a given session will receive reports of all errors related to that session.

Process Plans

Framework 62 reports all warnings and errors related to a Process Plan (and its associated components 64, Links, etc . . . ) to the user of the plan. Warning messages will not affect the status of the component 64 raising the warning, or of the Process Plan containing the component 64. Any KD Component that reports an error move to an Error State. If any KD Component 64 in a Process Plan moves to the Error State then the plan will be stopped (if it is running) and moved to the Error State. All other KD Components 64 in the Process Plan will move to a "has terminated due to an external action" state unless already in the "has terminated normally" state.

Logging

All warnings and errors that are related to Framework 62 are reported to a central log where a full history of warnings will be maintained. The name and location of the central log will be configurable by the administration user. All warnings and errors that are related to Framework 62 are further reported to a log at a local point in the Distribution Network where a recent history of warnings will be maintained. The name and location of the local log is preferably configurable by the administration user.

Data Storage

This section provides an overview of the storage requirements of KD framework 62 on the internal KD Storage mechanism. The KD Storage mechanism will support the addition, removal, and validation of Initialization Links and Result Links. In addition, the KD Storage mechanism facilitates the reading and saving of data from and to KD Storage, the storage and retrieval of Process Plans, the caching of large volumes of data required by Process Plans, and the distribution of the storage mechanism across a network of host machines. Access to each location in KD Storage is preferably controlled on a per-user basis

External Interface Specification

The external interface to the KD Framework will be divided into a number of areas:

APIs

Data Library

Import/Export File Formats

These are specified in the following sections.

Application Programmer Interfaces

The API to Framework 62 is divided into two sub-sections: the KD Framework API, designated with reference numeral 68 in FIG. 5, and the KD Component API designated with reference numeral 66 in FIG. 5.

KD Framework API 68

The API 68 to Framework 62 facilities covers the following areas of functionality:

Component Registry

Business Data Dictionary

Process Plans

KD Storage

Administration

KD Component API 66

The API 66 to KD Components 64 facilities covers the following areas of functionality:

Component Configuration Information

Component Descriptive Information

Security

In the presently disclosed embodiment, Framework 62 provides a flexible central security system such that a different security model to that specified in this section can be incorporated into Framework 62 by only replacing the central security system. The flexible security system preferably provides mechanisms such that any API call can fail due to security checks made by the security system. Any API call that does not provide for these security checks should be clearly documented. If an operation is attempted that fails due to the security requirements specified in this section then an error will be logged.

Administration

Framework 62 will provide a default administration user. The default administration user has the ability to perform any of the operations that are available within Framework 62 (with the proviso that any restrictions imposed by the licensing model will take priority). In particular, the default administration user has the ability to assume the identity of any other user and perform operations as that user, to set all of the security access permissions in Framework 62, to specify that other users have the same security permissions as the default administration user, to load the user information required for the flexible central security system from file, to configure the name and location of the central error and warning log, and to configure the name and location of the local error and warning logs.

Users

The ability to add, update or remove framework users is preferably controlled by a single security permission.

Component Registry

The ability to modify the public area of the Component Registry will be controlled by a single security permission. Each user will be able to modify the private area of the Component Registry for that user. Read access to individual KD Components to add the component to a Process Plan will be controlled on a per-user basis.

Plan Registry

The ability to modify the public area of the Plan Registry is preferably controlled by a single security permission. Each user will be able to modify the private area of the Plan Registry for that user. Read access to individual Process Plans will be controlled on a per-user basis.

Business Data Dictionary

The ability to add, update or remove source data descriptions is preferably controlled by a single security permission. The ability to add, update or remove BDD Domains and Domain Characteristics is preferably controlled by a single security permission. Read access to individual source data descriptions is preferably controlled on a per user basis. Read access to individual BDD Domains is preferably controlled on a per-user basis.

Distribution Network

All operations to modify the Distribution Network (e.g. to add a host machine or set availability times) is preferably controlled by a single security permission. All users will have the ability to read the contents of the Distribution Network, with the proviso that access to individual hosts within the Distribution Network is controlled on a per user basis.

Process Plans

The user of an Active Plan may connect to the plan for any purpose. In particular, the user of an Active Plan may perform any operation on the components and Links in the Process Plan to define, schedule, distribute, run and monitor the plan.

KD Storage

Access to each location in KD Storage is preferably controlled on a-per-user basis.

Performance/Scale

In accordance with one aspect of the invention, in order to take advantage of a distributed network of processing power, Framework 62 and individual KD Components 64 are preferably capable of being distributed across a network of machines. The Data Link mechanism that is provided to link KD Components together is preferably optimized and designed for a high throughput of data. Framework 62 preferably is designed to support multiple users executing multiple Knowledge Discovery Process Plans simultaneously and to provide feedback of information to the user on the progress of a given Active Plan. In one embodiment, Framework 62 is capable of taking advantage of SMP processor architectures.

Load Reduction

In order to reduce the load on any resources, Framework 62 will support mechanisms to reduce the load on any operation data resources (e.g. a machine with an operational database) by controlling access to that resource on a per-user basis, and to reduce the load on any operation data resources by caching any data retrieved from the resource. In this way, it is possible that only those parts of a Process Plan that have been modified need to be re-run in any subsequent runs of the plan.

Hardware and Software Environment

In the presently preferred embodiment of the invention, Framework 62 is written in the well-known Java™ programming language. And will operate on any platform running release 1.2 or later of the Java™ Virtual Machine (JVM). Additionally, Framework 62 preferably supports the inclusion of KD Components written in languages other than Java™ (e.g. C, C++).

The presently disclosed embodiment of the invention is based upon a client/server model in which Process Plans can be created and controlled from a client computer, while they are executed on one or more server platforms. In the presently disclosed embodiment, client computers can operate on the well-known Microsoft Windows™ operating system (e.g., Windows 98™ or Windows NT™. Server computers may be of a more powerful variety, for example a Sun Solaris™ of IBM RS/6000 mini mainframe computers.

Operational Overview

Figure 10A:
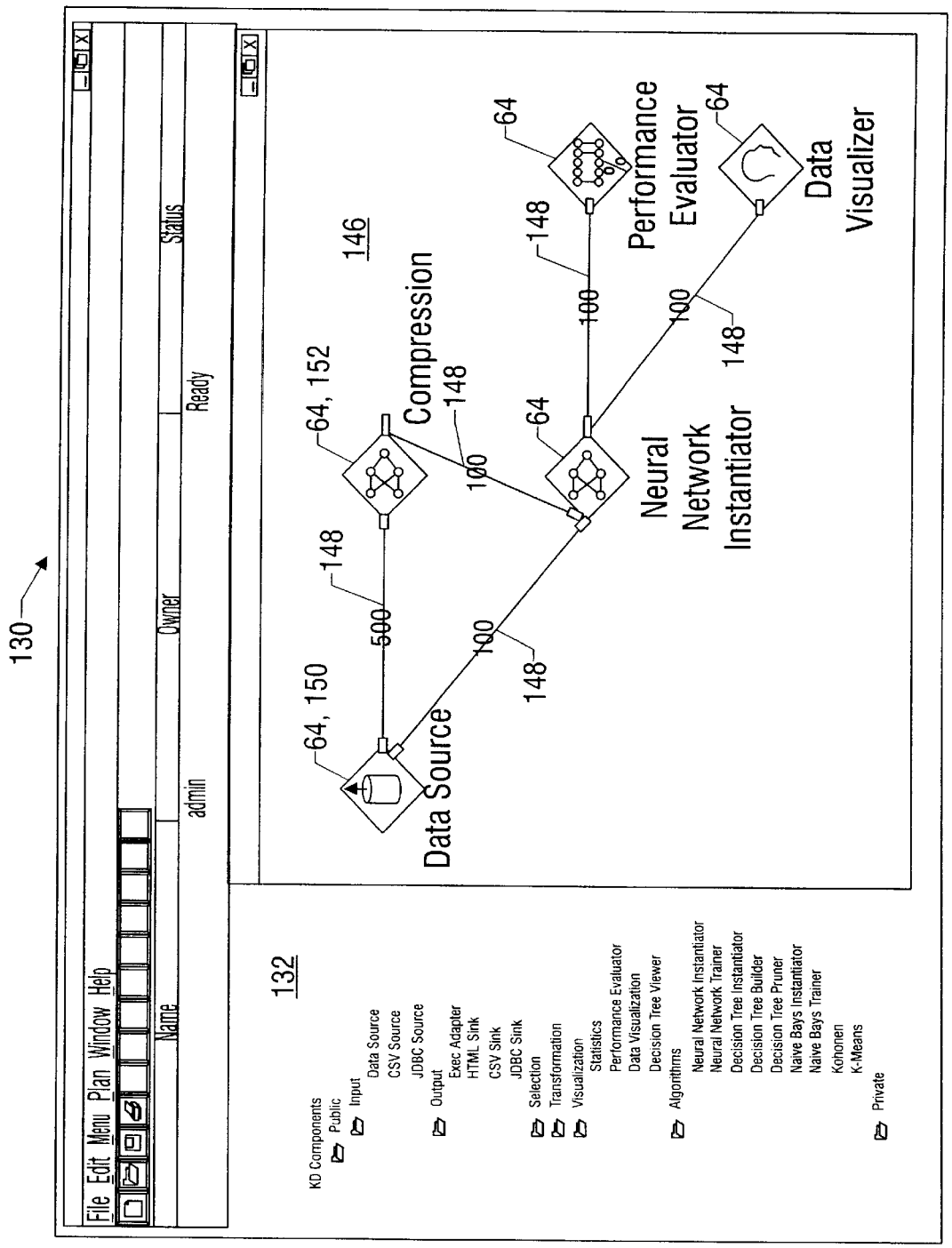
FIG. 10a is a representation of a graphical user interface presented to a user to create a knowledge discovery process plan.
Figure 10B:
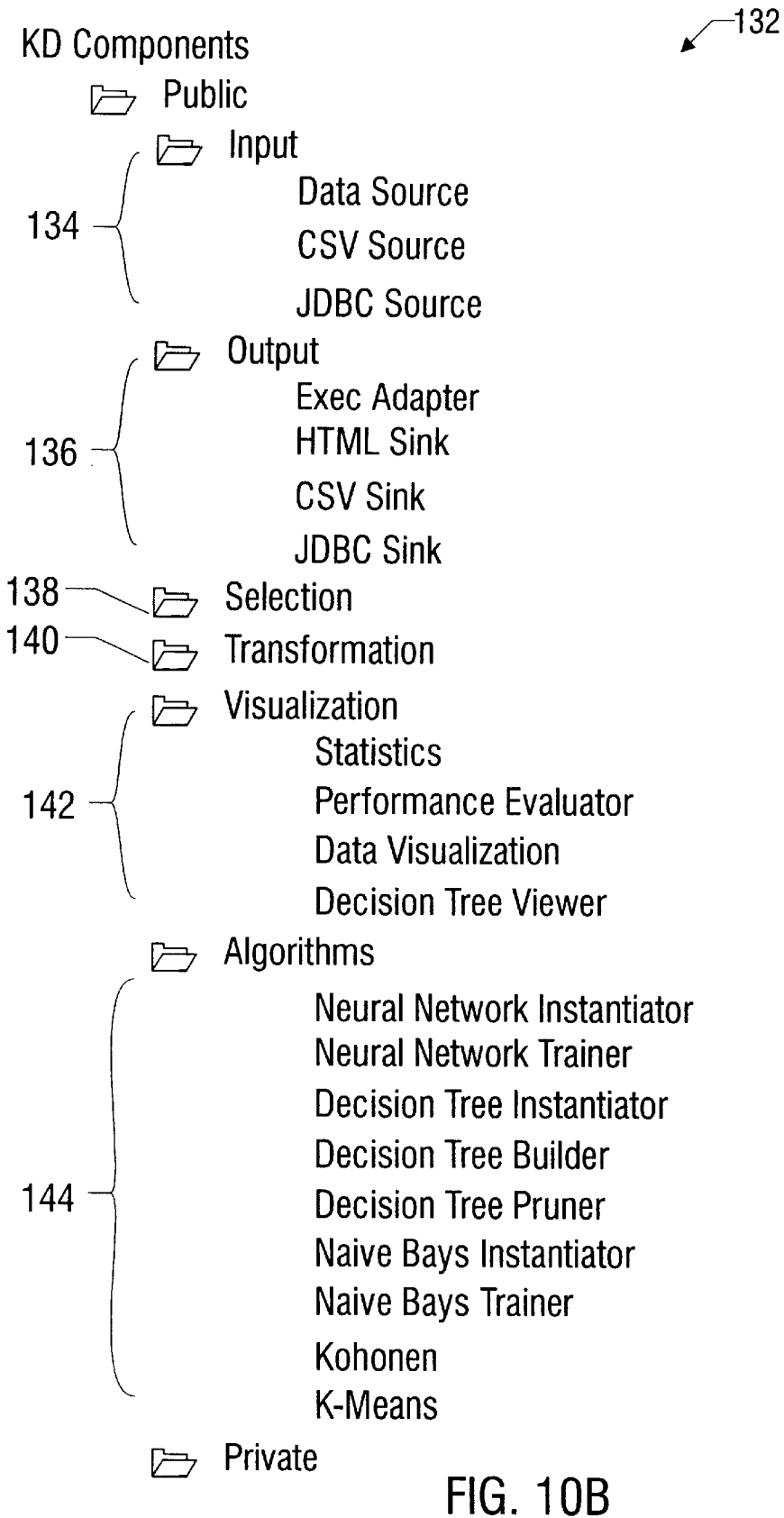

Turning now to FIGS. 10a and 10b, there is depicted an illustration of a graphical user interface ("GUI") 130 as it is presented on graphic display 116 to a user of a computer system 110 in accordance with the presently disclosed embodiment of the invention. In the presently disclosed embodiment, a user defines a project plan by assembling various components in graphic display 116 using mouse 118 in a click-drag-and-drop manner which will be familiar to those of ordinary skill in the art.

With continued reference to FIGS. 10a and 10b, to the left in display 116 is a menu 132 of KD Components 64 from which the user may select in order to construct a project plan. FIG. 10b is an enlarged view of menu 132. In the illustrative embodiment of FIGS. 10a and 10b, various categories of KD Components 64 are available, including input components collectively designated with reference numeral 134, output components collectively designated with reference numeral 136, selection components 138, data transformation components 140, visualization components 142, and algorithm components 144.

To the right in GUI 130 is a graphical representation 146 of a project plan. As described above, and as depicted in FIG. 10, project plans in accordance with the presently disclosed embodiment of the invention comprise a plurality of KD Components 64 interconnected by a plurality of links, which are designated with reference numerals 148 in FIG. 10. (As noted above, reference numeral 64 is used to designate KD components generically. However, at some points in present disclosure it is desirable to refer to specific KD components; in those instances, the KD Components in question will be designated both with reference numeral 64, to emphasize that the object being discussed is a KD Component, and with a unique reference numeral, to identify the specific KD Component being discussed. Likewise, in the disclosure that follows, links between KD Components 64 shall be designated generically with reference numeral 148, while specific links will be designated both with reference numeral 148 and with a unique reference numeral, as necessary in specific instances.)

Project plan 146 in FIG. 10 is typical of those in accordance with the presently disclosed embodiment of the invention. Project plan 146 includes a data source KD component 150 which serves to interface KD process 30 with a database from which knowledge is to be extracted. As those of ordinary skill in the art will appreciate, modern day databases can be very large. Indeed, it is not uncommon particularly for large businesses for databases of information to comprises hundreds of gigabytes of data. In many cases, databases of such magnitude can be essentially unmanageable by conventional systems for data manipulation and knowledge extraction.

Accordingly, and in accordance with a significant aspect of the present invention, KD process 30 relies upon a data compression technique to improve the efficiency with which components 64 can perform their intended functions, whether such functions involve transformation of the data, visualization of the data, and so on.

Those of ordinary skill in the art will be familiar with many different approaches to the process of data compression, one quantifiable measure of which being the overall percentage reduction in size of the data. One perceived drawback of many conventional data compression algorithms lies in their inability to achieve useful degrees of data compression while at the same time preserving the ability for the data to be efficiently processed and manipulated. That is, with many conventional data compression processes, the data is rendered unusable in its compressed state and must be decompressed before any meaningful data processing can occur. Those of ordinary skill in the art will appreciate that the processes of compressing and decompressing large data sets can themselves be substantially time-consuming. As a result, there is a trade-off between the benefits of performing compression (and, often, the requisite decompression) versus the efficiencies realized as a result of performing the compression in the first place.

In accordance with one aspect of the invention, a compression technology is employed which while on the one hand achieves substantial reductions in data set sizes, on the other hand does not require full decompression in order for the various components in the process plan to perform their designated functions. The compression technology presently preferred for the purposes of the present invention is referred to as "HIBASE," and is discussed in detail in W. P. Cockshott, et al., "The HIBASE Compressed Database," University of Strathclyde Computer Science Research Report 96/197, Mar. 11, 1996, which publication is hereby incorporated by reference herein in its entirety. Aspects of the HIBASE technology are also discussed in: PCT patent publication number WO 97/35256 filed Mar. 19, 1997 in the name of McGregor, et al., entitled "Array Indexing;" in PCT patent publication number WO 97/32263 filed Mar. 2, 1996 in the name of McGregor et al., entitled "Databases;" and in U.S. Pat. No. 5,471,611 to McGregor, entitled "Computerised Information-Retrieval Database Systems." These three McGregor et al. patents are each hereby incorporated by reference herein in their respective entireties.

Briefly, the HIBASE compression technology assumes that the data comprises a plurality of tuples, with each tuple comprises a data value in each of a plurality of fields. HIBASE compression involves defining a plurality of data "domains," and assigning each data values from the database being compressed into a corresponding domain, where data values in the same field are each assigned to the same domain. For each domain, a domain dictionary is generated matching each distinct data value assigned to that domain with a corresponding distinct token. Then, a tokenized store for each column of data in the database is created, wherein the corresponding distinct tokens are store for each field data value. All of the tokens for a domain are initially the same size. When further tuples are received for storage, the data values are compared in the corresponding domain dictionary and if no match is found, a new token within the existing token size is created and added to the domain dictionary. If all tokens for a given domain are utilized, a new token is generated with a size at least one bit larger than the previous tokens for that domain. Such broadened tokens are entered into a new tokenized store for that column.

Databases compressed using the HIBASE technology achieve high compression ratios, in some cases reducing a database's size to approximately one to ten percent of its original size.

It is to be noted that although the HIBASE compression technology is presently preferred for the purposes of practicing the present invention, it is by no means the only data compression technology believed to be suitable for this purpose. Another compression technology which is believed to be potentially adaptable for the purposes of the present invention is Sybase IQ, commercially available from Sybase, Inc., Emeryville, Calif. The Aspects of the Sybase IQ compression technology are discussed in U.S. Pat. No. 5,649,181 to French et al., entitled "Method and Apparatus for Indexing Database Columns with Bit Vectors;" U.S. Pat. No. 5,794,228 to French et al., entitled "Database System with Buffer Manager Providing Per Page Native Data Compression and Decompression;" and U.S. Pat. No. 5,794,229 to French et al., entitled "Database System for with Methodology for Storing a Database Table by Vertically Partitioning All Columns of the Table." Compression technology which may have application in the context of the present invention is also proposed in U.S. Pat. No. 5,706,495 to Chadha et al., entitled "Encoded-Vector Indices for Decision Support and Warehousing." In one embodiment of the invention the HIBASE compression technology is employed in one instance at the "front end" of KD process 30 in order to substantially reduce the data set size of the database from which knowledge is to be extracted. It is believed by the inventors that the HIBASE technology can in many cases achieve a compression factor of ten or more, such that a database having an initial size of, for example, on the order of 100 gigabytes, can be reduced to one to ten gigabytes. At the same time, as noted above and in accordance with a significant aspect of the present invention, the HIBASE technology enables the data to be substantively manipulated without the necessity of decompression, thereby substantially increasing the overall efficiency of KD process 30.

Referring to FIG. 10, one example of how compression technology may be employed in accordance with the presently disclosed embodiment of the invention is by providing a KD Component 152 linked to the data source, for performing a HIBASE-based compression operation on the overall data set. This compressed data set can then be provided to "downstream" KD Components 64 for further processing. Since the HIBASE technology permits manipulation of the data without necessarily fully decompressing it, once the compression operation has been performed, downstream KD Components 64 essentially regard the output of compression component 152 as the effective KD Data Source. To the extent that KD components and operations are structured such that certain operations are to be repeated or iterated, the present invention offers the advantage that the initial compression step performed by KD Component 152 need not be repeated, thereby substantially enhancing the efficiency of KD process 30.

In accordance with yet another aspect of the present invention, and as mentioned above, it is contemplated that any or all links 148 between KD Components 64 in a KD Process Plan such as Plan 146 depicted in FIG. 10 may be designated as caching links adapted to maintain a cache of the data transferred across them. A significant benefit to such capability arises as a result of the sometimes iterative and repetitive nature of the operation of the various KD components 64. In particular, it is to be noted that as a result of the topology of a given process plan, apparent in graphical representation such as representation 146 in FIG. 10, it is necessary for one KD Component 64 to accomplish its designated function before a "downstream" KD Component 64 can execute its function. If a given Component 64 operates in a repetitive or iterative manner, or is forced to restart its operation as a result of an error occurring during processing, the availability of a cache holding the output of one or more upstream KD Components 64 enables the repeated or iterative operation of the first component to proceed without first repeating or iterating the functions of the one or more upstream KD Components 64. This can greatly enhance the operational characteristics and overall efficiency of KD process 30.

In accordance with a further significant aspect of the invention, it is contemplated that links in process plan 146 which are designated as caching links can employ a second iteration of the aforementioned HIBASE compression technology in the process of creating the desired caches. That is, in addition to compressing the data as an early stage of the KD Process Plan, the caches of data maintained by designated caching links again applies the HIBASE compression technique. This achieves a further substantial reduction in the size of the database, thereby making it feasible to designate multiple caching links within a process plan without requiring an impractical amount of computer memory in which to maintain those caches. For example, as noted above, the initial application of data compression can reduce a 100 gigabyte database to a compressed size on the order of 1 gigabyte. Upon further compression performed at a caching link in the process plan, the cached database may be on the order of only hundreds of megabytes. Without application of compression technology in formation of data caches in caching links, the amount of memory or other mass storage required to maintain such caches could be impractical.

From the foregoing detailed description, it should be apparent that a method and apparatus for knowledge discovery from databases has been disclosed in which a plurality of process plan components cooperate to extract meaningful information from potentially very large databases of information. A data compression technique is initially applied to the database to improve the overall efficiency of the KD process, and the maintenance of caches corresponding to the output of one or more of the process plan components further improves the performance of the system.

Although a specific embodiment of the invention has been described herein in some detail, this has been done merely to illustrate various features and aspects of the invention, and is not intended to be limiting with respect to the scope of the invention as defined in the claims below. It is contemplated that various substitutions, alterations, and/or modifications, including but not limited to those design alternatives and implementation-specific details which may have been specifically identified herein, may be made to the disclosed embodiment without departing from the spirit and scope of the invention as defined in the claims.

What is claimed is:

1. A method of extracting knowledge from a database containing records of information, comprising:
    (a) defining a process plan comprising a plurality of components each adapted to perform a designated function upon said records, said plurality of components being interconnected by a plurality of links representing a transfer of records from an output of a first component to an input of a second component;
    (b) performing a data compression function to yield a compressed database;
    (c) supplying said compressed database to said components in said process plan such that each component performs its designated function upon said records to yield desired knowledge from said database; and
    (d) maintaining said records transferred across one of said plurality of links in at least one cache, said cache being accessible by at least one of said components.

2. A method in accordance with claim 1, further comprising:
    (e) performing said data compression function on said at least one cache.

3. A method in accordance with claim 1, wherein each component is of a type selected from the group of: data source components, data reduction components, data transformation components, algorithm components, data sink components, and data visualization components.

4. A method in accordance with claim 2, further comprising:
    (f) maintaining a data directory containing information describing the organization of data in said database; and
    (g) consolidating said desired knowledge from said database into a form suitable for reporting.

5. A system for extracting knowledge from a database containing records of information, comprising:
    one or more processing units, said processing units coupled to each other by a network, wherein said processing units execute software to create a framework within which one or more process plans are designed, managed, modified, tested, evaluated, run, and stored for future use, wherein said network includes one or more network interface cards, each network interface card coupled to one processing unit and connecting said processing units through physical means;
    one or more data storage units coupled to each of said processing units, said data storage units containing said records of information, wherein said records of information can be used throughout the framework in compressed form; and
    wherein a user interacting with the framework implements said process plan to extract knowledge from the database, said process plan including components that perform functions on the records of information, each of said components representing a different stage of knowledge extraction, wherein components in the process plan execute on different processing units as decided by the framework, said components connected by data links over said physical means, said data links operating to permit the output of one component to be applied to the input of another.

6. The system of claim 5, wherein said records of information can be transferred between components in compressed form, wherein decompression of the records of information is not necessary in order for components in the process plan to perform said functions.

7. The system of claim 6, wherein individual components can receive the records of information in compressed form or request the framework to send individual records of information in uncompressed form.

8. The system of claim 6, wherein the framework includes a data dictionary, wherein each component can access the data dictionary to obtain information about the records of information before the component receives the record.

9. A method of discovering knowledge from a database by employing a process plan including a number of components to perform functions on records of the database, comprising the steps of:
    (a) specifying the knowledge to be discovered from the database;
        (a1) performing a data compression function to yield a compressed database;
    (b) selecting records of information from the database that suit the knowledge specification; and
        (b1) supplying said compressed database to said components in said process plan such that each component performs its designated function upon said records.

10. A method in accordance with claim 9, further comprising:
    (c) preprocessing the selected records to remove noise or extrapolate for missing records;
    (d) transforming the records to be usable with an analysis algorithm;
    (g) consolidating results into a reportable format for knowledge discovery; and
    (h) reporting the consolidated results.

11. A method in accordance with claim 10 wherein the step of transforming the records scales the records between two numbers.

12. A method in accordance with claim 10, further comprising:
   (e) mining the transformed records to isolate characteristics between the records, said mining performed by the analysis algorithm.

13. A method in accordance with claim 12 wherein the analysis algorithm is a neural network algorithm.

14. A method in accordance with claim 12 wherein the step of mining the records includes travelling a decision tree to isolate characteristics.

15. A method in accordance with claim 12, further comprising:
   (f) interpreting the results generated by mining.

16. A method in accordance with claim 15 wherein the step of interpreting the results includes assessing the quality of the results using visualization tools.

17. A method in accordance with claim 15, wherein consolidating the interpreted results includes documenting and acting on the results.

* * * * *